(12) United States Patent
Spooner (10) Patent No.: US 12,157,279 B2
(45) Date of Patent: Dec. 3, 2024

(54) METHOD OF MAKING A THICK ARTICLE

(71) Applicant: QinetiQ Limited, Farnborough (GB)

(72) Inventor: Christopher Douglas James Spooner, Bracknell (GB)

(73) Assignee: QinetiQ Limited, Farnborough (GB)

( * ) Notice: Subject to any disclaimer, the term of this patent is extended or adjusted under 35 U.S.C. 154(b) by 209 days.

(21) Appl. No.: 17/630,797

(22) PCT Filed: Jul. 28, 2020

(86) PCT No.: PCT/EP2020/071187
§ 371 (c)(1),
(2) Date: Jan. 27, 2022

(87) PCT Pub. No.: WO2021/023563
PCT Pub. Date: Feb. 11, 2021

(65) Prior Publication Data
US 2022/0281180 A1    Sep. 8, 2022

(30) Foreign Application Priority Data

Aug. 5, 2019 (GB) .................................. 1911146

(51) Int. Cl.
*B29C 65/00* (2006.01)
*B29C 45/00* (2006.01)
*B29L 11/00* (2006.01)

(52) U.S. Cl.
CPC .......... *B29C 66/71* (2013.01); *B29C 45/0001* (2013.01); *B29L 2011/0016* (2013.01)

(58) Field of Classification Search
None
See application file for complete search history.

(56) References Cited

U.S. PATENT DOCUMENTS

2005/0173044 A1    8/2005   Drummond et al.

FOREIGN PATENT DOCUMENTS

JP    2008221530 A    9/2008
WO    2010/026533 A2   3/2020

OTHER PUBLICATIONS

Machine English translation of JP2008221530, Accessed Feb. 26, 24 (Year: 2008).*
McClintock, Cat, What Are the Benefits of Using CAD Software?, https://www.ptc.com/en/blogs/cad/what-are-the-benefits-of-using-cad-software (Year: 2018).*
International Searching Authority, International Search Report and Written Opinion mailed on Oct. 26, 2020, issued in connection with International Patent Application No. PCT/EP2020/071187, filed on Jul. 28, 2020, 11 pages.

* cited by examiner

*Primary Examiner* — Jacob T Minskey
*Assistant Examiner* — Adrianna N Konves
(74) *Attorney, Agent, or Firm* — McDonnell Boehnen Hulbert & Berghoff LLP (57) ABSTRACT

Method of making a shaped article (5) comprising at least two parts (10, 15) wherein the first part comprises at least one projection (20) and the second part comprises at least one recess (22) by preparing said first part and said second part in a moulding process and joining the prepared first and second part together by engaging the at least one projection with the at least one recess to form said shaped article.

14 Claims, 4 Drawing Sheets

METHOD OF MAKING A THICK ARTICLE

The present application is a national stage entry of PCT/EP2020/071187 filed on Jul. 28, 2020, which claims priority to Great Britain Patent Application No. 1911146.7 filed Aug. 5, 2019, the contents of each of which are hereby incorporated by reference.

FIELD OF THE INVENTION

The present invention relates to a method of making a shaped article comprising thick sections in its geometry and comprising or consisting of a number of shaped parts which may each themselves have thick sections within their geometry. The present invention also relates to shaped articles obtainable from said method.

BACKGROUND OF THE INVENTION

The manufacture of shaped polymer parts to a high level of precision presents a number of challenges, particularly when thick sections are required by the part geometry. Further, these thick section parts may form part of a larger assembly of parts to form a complex shaped article or product and the product function may require maintenance of desired properties at the interface between parts and in the main body thereof. It may not be possible to redesign functional components of this nature to allow for easier manufacture, as the geometry is critical to the function and changes to geometry may deleteriously affect the product function.

Such a level of precision may be required in preparing so called Radio Frequency (RF) products. RF products are generally taken to mean devices or products which operate in the radio wave region of the electromagnetic spectrum, with wavelengths longer than infrared light. They have frequencies from about 3 kHz to about 300 GHz, and corresponding free space wavelengths from about 100 km to about 1 mm. More recently the terahertz frequency domain is being used. Terahertz is typically defined as the frequency range of 100 GHz to 30 THz with corresponding wavelength of 3 mm to 0.01 mm. Particular types of lens may also operate within this range of the spectrum. It is known to make multilayer RF products such as lenses, Luneberg lenses, beam forming optics, waveguides, retro-reflectors and resonators. A similar level of precision may also be required to manufacture multi-material functional components such as: sensors, actuators, motors, valves, and pharmaceutical products such as implants, prosthetics, applicators, medicine dispensers and the like.

Certain applications may require the various layers forming the products or lenses to possess different material properties, e.g. being able to control the permittivity is desirable for many RF products. The product or article may therefore comprise a number of layers of varying chemical constitution and/or shape which must be made separately. The parts may be complex in shape, e.g. comprising parts of constantly varying section thickness and/or doubly curved surfaces, and a low cost manufacturing process may be required to manufacture the product in large volume and economically and, at the same time, retain a good quality bond between the layers which does not deleteriously affect the material properties of the product.

Injection moulding is a low cost scalable technique for making the various polymer parts of a product such as a lens. However, the parts which may be made from injection moulding are limited in section thickness mainly due to the low thermal conductivity of polymers and the shrinkage of thermoplastic polymers on solidification and cooling from the melt processing temperature back down to room temperature.

Injection moulded parts are typically assembled to form a shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers.

Thermoplastic polymers tend to suffer significant shrinkage during cooling and solidification from the melt processing temperatures which allow the polymer to adopt the shape of the cavity during the injection moulding process. This leads to limitations to the part thickness which may be successfully moulded, typically no greater than about 4 mm in thickness. For the purposes of the present invention thick section parts are those possessing a section thickness of greater than 4 mm. Section thicknesses of the order of about 7 mm are feasible to injection mould in some situations, however this requires careful tool design and success may depend on other features of the part geometry. With thicker part sections it becomes increasingly difficult to maintain suitable part density during the cooling phase of injection moulding and voids and sink marks may result. Sink can lead to difficulty in controlling the geometry. Large variations in section thickness can lead to voids and sink marks in thicker areas of the part, residual stresses moulded into the part, and warpage on removal from an injection moulding tool. Hence there is a need for methods which deliver consistent section thickness across the area of a given part.

Polymers also tend to have poor thermal conductivity which limits the rate at which the parts can be cooled to a low enough temperature to allow removal from a mould tool without deforming the geometry of the part. Cycle time is a key parameter in injection moulding which contributes to minimising the cost of any parts.

SUMMARY OF THE INVENTION

It is an object of the present invention to address at least some of the afore-mentioned problems and to provide a method which is capable of providing thick section shaped articles and parts thereof which have hitherto proved difficult to obtain from existing techniques such as injection moulding. The present invention comprises creating a design of said shaped article and defining a split line on said design, (or the present invention comprises defining a split line on a design of a shaped article), wherein said split line divides the shaped article to provide at least a first part and a second part. The present invention provides a method for making thick section shaped articles wherein the shaped article comprises an assembly, wherein said assembly comprises said at least first part and second part (i.e. at least two parts or only two parts) which are joined together to form said assembly. The at least first and second parts may be referred to herein as the parts or the joined parts. The parts may be joined by at least one recess on one of the parts cooperating with at least one projection on the other part. Prior to being joined, the at least two parts are formed in a moulding (preferably an injection moulding) tool. The recess may be in the form of a gap or hole or indentation. By providing a method which comprises the step of joining at least two parts, then thicker section parts which constitute the final shaped article may be split in to constituent parts possessing a reduced maximum section thickness. Preferably, the number of parts is minimised in order to minimise tool and moulding costs while at the same time maintaining all part sections below a given thickness, for example below 4 mm while at the same time retaining the original design shape for the shaped article. In addition, by providing projections and recesses on said parts the present invention addresses, inter alia, the problem of how to form the final product with improved properties.

As such, and in a first aspect, the present invention provides a method of making a shaped article comprising at least two parts which are joined, the method comprising:

creating a design of said shaped article and defining a split line on said design (or comprises defining a split line on a design of a shaped article), wherein said split line divides the shaped article to provide at least a first part and a second part;

wherein said first part comprises at least one projection;
wherein said second part comprises at least one recess;
preparing said first part and said second part in a moulding process;
joining the prepared first part and the prepared second part together by engaging the at
least one projection with the at least one recess.

The moulding process is preferably an injection moulding process.

As such and in a second aspect there is provided a method of making a shaped article comprising at least two parts which are joined, the method comprising:

creating a design of said shaped article and defining a split line on said design (or comprises defining a split line on a design of a shaped article), wherein said split line divides the shaped article to provide at least a first part and a second part;

wherein said first part comprises at least one projection;
wherein said second part comprises at least one recess;
preparing said first part and said second part in an injection moulding process;
joining the prepared first part and the prepared second part by engaging the at least one projection with the at least one recess.

In a third aspect there is provided a shaped article obtainable from the first or second aspects of the invention.

The split line is preferably a single continuous split line.

In the at least two parts, the at least one projection may possess a thickness which is greater than two times less than the section thickness of the (original) design (part).

In the at least two parts, the at least one projection may possess a thickness of less than about 4 mm.

In the at least two parts, all of the section thicknesses present are preferably less than 4 mm.

In the method of the invention, the design of the shaped article may be split into any number of parts. For example, there may be up to ten parts formed. There may be up to 100 parts or more. In the method in accordance with the invention there may be less than six parts, for example less than five parts, for example less than four parts, for example less than three parts. The at least two parts may be the only parts which constitute the shaped article.

The at least two parts are typically thermoplastic or at least one of the parts is thermoplastic. The at least two parts may be (thermoplastic) polymer comprising a filler material. Reference may be made herein to a polymer composition, i.e. the at least two parts may be at least two polymer compositions.

The at least two parts, i.e. the prepared first part and prepared second part may be joined by welding. Alternatively, the at least one projection and at least one recess may engage such that no further step is required to complete joining of the parts. The at least two parts may be joined in a snap fit arrangement.

Examples of suitable polymer are selected from polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimde (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU), epoxys, silicones, phenolics, polyesters, or any thermoplastic (or thermosetting) polymer which is readily moulded.

The at least two parts may each possess different material properties or more typically may possess the same material properties given that they are designed from an original part which is to be formed by said at least two parts. For example, each part may possess a different or the same dielectric constant, permittivity (e.g. real permittivity), density, magnetic permeability, conductivity, modulus or colour. The value of the permittivity of the material properties of different parts may be controlled by varying, independently of each other, one or any combination of polymer, filler and relative amounts thereof. In accordance with the various aspects and embodiments of the present invention, the at least two parts may be not greater than two parts, i.e. only two parts.

The at least two parts, e.g. at least two polymer compositions may comprise a filler or filler material. The amount of filler may be present in an amount of 0 vol % to 60 vol %, preferably 0 vol % to 30 vol %. The amount of filler may be present in an amount of at least 5 vol %. The amount of filler or filler material is calculated from the mass ratio of the constituent components in the mixture and the bulk density of the materials. The filler may be selected from ceramics, minerals, metals, metal compounds, polymers, and natural materials such as wood. The filler may be particulate (e.g. spherical, faceted, or platelet) or fibrous in shape.

The at least two parts may be in the form of layers, e.g. polymer layers or filled polymer layers. Any number of the parts may be curved, e.g. doubly curved. By a doubly curved surface is meant a surface which has its radius in simultaneously two planes. Spheres and hemispheres are examples of doubly-curved surfaces. All of the layers in the shaped article may be curved, e.g. doubly curved. Each of the layers may possess different material properties, such as permittivity.

The shaped article may be a functional product filled with various filler constituents to allow it to carry out a function, such as electrically conductive fillers to act as an electrical conductor, magnetic fillers to act as a magnet, or dielectric fillers to influence RF energy for an RF product. For example, the shaped article may be a lens, e.g. a multilayer lens, e.g. a beam forming lens, e.g. a Luneburg lens. The lens may comprise or consist of curved layers. At least one, or any combination, of the layers may be doubly curved. Each of the layers may possess a different permittivity or permeability.

There may be present greater than one projection on at least one of the parts. The number of projections present is not necessarily limited and an appropriate number of projections are present in order to effectively form a continuous split line between the two parts so neither part has a section thickness greater than the maximum section thickness required of the moulding process, for example 4 mm. Any of the parts present may possess a combination of projections and recesses. Therefore, the first part may comprise at least one projection and at least one recess, and/or the second part may comprise at least one projection and at least one recess. The projection(s) referred to herein may be in the form of castellation(s).

Advantageously, the method in accordance with the present invention provides one or more of the following advantages: the provision of complex shaped articles possessing thick cross-sections, minimal or no deformities such as sink defects, high geometrical tolerance, lower cycle time and part manufacturing cost while maintaining the design footprint of the original part design once the at least two parts are assembled and joined. In addition, the method in accordance with the present invention is scalable to relatively large section parts without the need to increase the maximum section thickness of a given part or requiring the part to be split into more than two parts if so desired.

The incorporation of the projections (or castellations) and associated geometries described herein seeks to provide a method for making shaped articles with desired geometries by designing constituent parts which, when assembled, provide said shaped article. This is achieved in accordance with the present invention by designing the article and introducing a split line in order to split the article into a number of parts. Preferably the shaped article is split into two parts.

The projection or castellation geometry described herein allows the same thick section footprint to be realised in the finished article whilst not having to mould any section which is thicker than that easily attained by (injection) moulding. Advantageously, a broad range of section thickness can be broken up or divided in this way.

Figure 3:
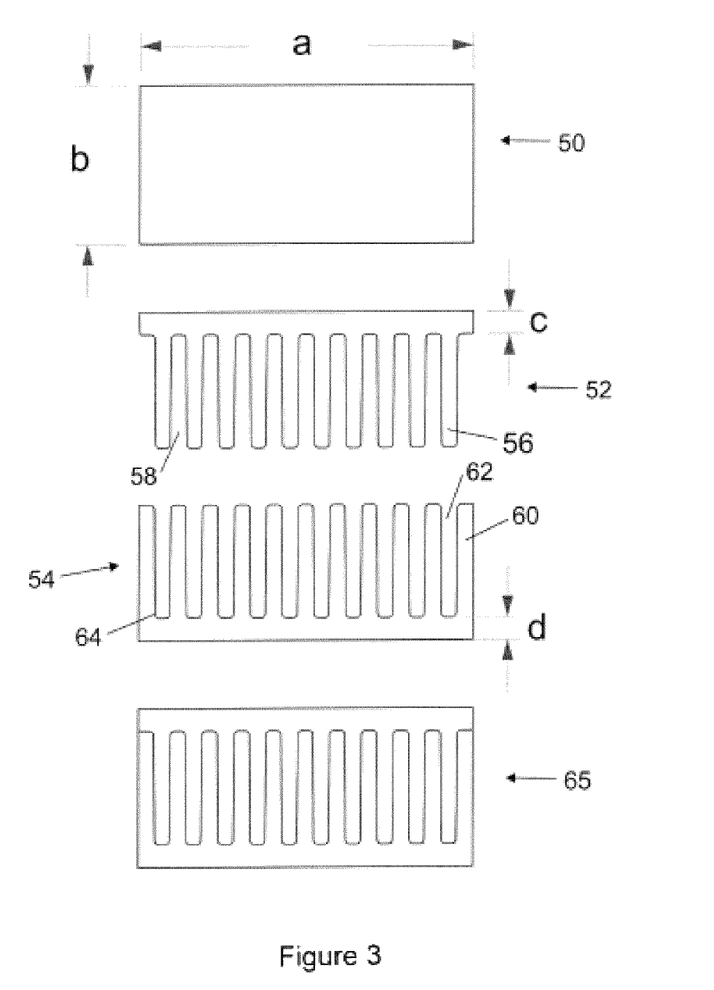
FIG. 3 illustrates the cross section of a shaped article and its constituent parts in accordance with the present invention and associated typical dimensions.

For example, the simple rectangular plate cross section in FIG. 3 may be 28 mm thick. This could not be injection moulded (or at least not to any economical or acceptable standard) and typically may need to be split into six or more parts if it is to be injection moulded. Advantageously, and in accordance with the present invention, the projections (e.g. castellations) allow this part to be moulded in only two parts whilst maintaining the maximum section thickness in the moulded geometry of the at least two parts below 4 mm, thus providing a simplified method for moulding thicker shaped articles in more economically acceptable cycle times and without losing control over geometry due to sink and void formation.

The at least two parts may be joined together by polymer welding techniques such as ultrasonic welding or vibrational welding. In these techniques, energy is directed to the bondline by frictional heating under a clamping force which melts a thin interfacial layer of the part or parts which are typically made from thermoplastic polymers.

Parts may also be designed with snap fitting projections or snap fitting joints where the geometry of one part is designed with a locking feature on the end of a projection (e.g. lever) which flexes to one side during part assembly and allows the parts to be pushed together until the locking feature fits into a matching recess (or depression) on the second part (which may also be referred to as a locking feature, or complimentary locking feature). The stored energy due to deformation of the projection or lever allows the projection or lever on the first part to move back to its original position once the locking feature is accepted in the depression or complimentary locking feature, leading to an interference fit due to the geometry (e.g. one or more undercuts) that allows for the parts to be temporarily or permanently held together. The degree to which the joint is permanent or temporary is typically dependent on the design of the projections or locking features.

A further technique developed by the present inventors comprises the assembly of parts in a single processing step by re-melting the assembly of parts within a tool designed to match the outer circumference shape of the assembly. This method is well suited to assembling many thermoplastic parts and is well suited to the assembly of the at least two (complex) parts which may be shaped resulting from this invention. As such, the at least two prepared parts may be joined in a method which comprises:

assembling the at least two prepared parts in a cavity of a tool to form an assembly of the at least two parts, wherein said cavity is adapted to receive the assembly of at least two parts in the form of the shaped article;

sealing the cavity of the tool;

melting the assembly of at least two parts to chemically bond the at least two parts together to form the shaped article.

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

Though the present application may tend to focus on the construction of multi-layered (RF) lens structures it will be appreciated that the techniques described herein are applicable to any thick section multi-layered/multi-part assembly comprising (thermoplastic) parts and particularly complex shaped articles which would be difficult to manufacture by alternative means.

The Shaped Article

The shaped article in accordance with the present invention may be formed using a moulding technique such as injection moulding.

Injection moulding is a manufacturing process for producing parts by injecting molten material into a mould. Material for the part is typically fed into a heated container (e.g. a barrel), mixed (typically using a helical shaped screw) and injected or forced into a mould cavity where it cools and hardens to the configuration of the cavity. The mould may be made from metal such as steel or aluminium and precision machined to form the features of the desired part. Injection moulding is ideal for producing high volumes of the same object. Aluminium moulds are less well suited for high volume production or for parts with narrow dimensional tolerances as they tend to have inferior mechanical properties and are more prone to wear, damage and deformation during the injection and clamping cycles. However, aluminium moulds are cost effective in low volume applications as mould fabrication costs and time are considerably reduced. Many steel moulds are designed to process well over a million parts during their lifetime though tend to be more expensive.

Typically, injection moulding uses a ram or screw-type plunger to force molten plastic material under high pressure into a mould cavity. This solidifies into a shape that has conformed to the contour of the mould. Injection moulding is suitable for processing both thermoplastic and thermosetting polymers. Thermoplastics are highly suitable for injection moulding such is the ease with which they may be recycled, their versatility allowing them to be used in a wide variety of applications, and their ability to soften and flow upon heating. Moulds may be of a single cavity or multiple cavities.

When thermoplastics are moulded, typically, pelletized raw material is fed through a hopper into a heated barrel with a reciprocating screw. Upon entrance to the barrel, the temperature increases and the viscosity is reduced enabling the polymer to flow with the driving force of the injection unit. The screw delivers the raw material forward, mixes and homogenises the thermal and viscous distributions of the polymer, and reduces the required heating time by mechanically shearing the material and adding a significant amount of frictional heating to the polymer. The material feeds forward through a check valve and collects at the front of the screw into a volume known as a shot. A shot is the volume of material that is used to fill the mould cavity and provides a cushion to transfer pressure from the screw to the mould cavity. When enough material has gathered, the material may be forced at high pressure and velocity into the part forming cavity. To prevent spikes in pressure, the process typically uses a transfer position corresponding to a 95-98% by volume full cavity where the screw shifts from a constant velocity to a constant pressure control. Often, injection times are well under one second. Once the screw reaches the transfer position the packing pressure is applied until the gate or cavity entrance solidify. Due to its small size, the gate is normally the first place to solidify through its entire thickness. Once the gate solidifies, no more material can enter the cavity and accordingly the screw reciprocates and acquires material for the next cycle while the material within the mould cools so that it can be ejected and be dimensionally stable. Once the required temperature has been achieved, the mould opens and an array of pins, sleeves, strippers are driven forward to demould or release the article. Then the mould closes and the process is repeated.

Injection moulding is advantageous over other moulding techniques for a variety of reasons, including a lower cycle time, geometrical precision, and improved process control.

The At Least Two Parts

The method in accordance with the present invention comprises creating or taking a design of a shaped article and defining a split line on said design, wherein said split line divides the shaped article to provide at least a first part and a second part. The split line is preferably a single and continuous line. The design may be created using computer aided design (CAD) software, a drawing or a geometrical model. Examples of suitable 3D drawing software are Solid Edge™ or Solid Works™.

The at least two parts are preferably polymers or polymer compositions comprising a polymer. The number of parts may be only two parts.

The polymer is preferably a thermoplastic polymer. The thermoplastic polymer may be selected from one or more of a number of polymers. Any of the polymers mentioned herein for use in the present invention may be a homopolymer or a copolymer. The polymer may be in the form of a resin. The term resin may be taken to mean a polymer material, either solid or liquid, prior to its shaping in to the shaped article. For ease of reference, the polymer referred to in the various aspects of the invention may be referred to herein as the host polymer.

The (host) polymer may be selected from one or more of the following polymers, which may be present as homopolymers or copolymers: polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU), epoxys, silicones, phenolics, polyesters, or any thermoplastic or thermosetting polymer which is readily moulded.

The host polymer may be selected from one or more of polyethylene (PE) and polypropylene (PP). These polymers may be present as homopolymers or copolymers. The polymer or polymers may be present in low density or high density form. The host polymer may be selected from one or any combination of low density polyethylene (LDPE), linear low density polyethylene (LLDPE) and high density polyethylene (HDPE). The typical densities and mean molecular weight values are provided in Table 1 for these polymers.

TABLE 1

| PE type | Typical Density (g/cm$^3$) | Mean molecular weight (g/mol) |
|---|---|---|
| LDPE | 0.910-0.925 | <200,000 |
| LLDPE | 0.910-0.940 | <50,000 |
| HDPE | 0.941-0.965 | <50,000 |

The host polymer may be crosslinked after formation of the at least two parts and assembly of the at least two parts. Advantageously, cross-linking of the polymer may increase the service temperature and heat deflection temperature. By service temperature is meant the temperature at which the polymer is used in a particular application. An alternative term for service temperature is operating temperature.

Following their formation, the at least two parts are joined together to form the shaped article. The at least two parts may be aligned and joined by the engagement of the projection(s) and recess(es) or by the engagement of castellations, present on each of the first and second parts. The at least parts may be welded together using polymer welding techniques as described herein. The at least two parts may be bonded using chemical adhesives. Optionally, if an additional locking feature(s) is incorporated in one or more of the projections which are designed to mate to a corresponding feature in the mating part (e.g. depression) leading to an interference fit (known as a snap fit), further treatment to join the at least two parts together may not be required.

The method in accordance with the present invention comprises the following steps:

providing a first part wherein said first part comprises at least one projection;

providing a second part wherein said second part comprises at least one recess;

joining the first part and the second part together by engaging the at least one projection with the at least one recess.

The at least one projection may be any shape and/or size. For example, the projection may be essentially, square, rectangular or curved in cross section or may comprise a combination of curved edges and straight edges. Though the method of the present invention is directed to at least one of the parts comprising a projection and the other part comprising a recess, it will be appreciated that the presence of projections on a part may inherently result in the presence of a recess or gap on said part.

The at least one projection may be one or more castellations. The one or more castellations may be an annular ring or rings, a linear rib or linear curved ribs, a curved rib or curved ribs.

The castellation (parent castellation) may itself comprise one or more castellations situated thereon or extending therefrom which may be referred to herein as child castellations. Said child castellation or castellations may comprise one or more castellations situated thereon or extending therefrom which may be referred to herein as grandchild castellations. The same terminology may be more generally applied to the term projection(s), i.e. child projections and grandchild projections.

Advantageously, the projections, e.g. in the form of castellations form an alignment feature to aid in the alignment of parts during assembly of parts following moulding. This is particularly beneficial if robotic or automated equipment is used to handle or assemble the parts.

Figure 4:
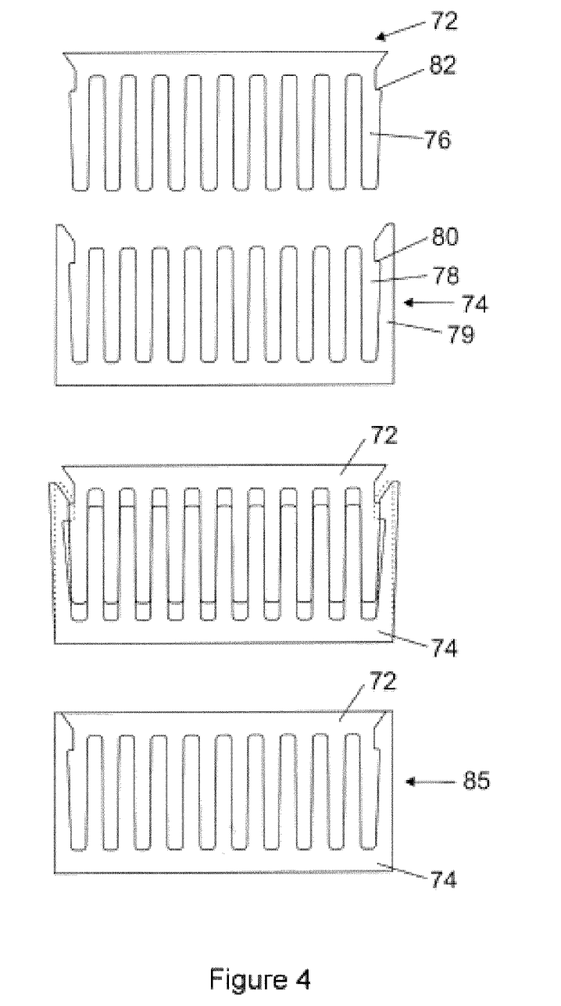
FIG. 4 shows a modification to the parts shown in FIG. 3 to facilitate a snap-fit arrangement.

One or more of the projections or castellations may comprise a locking feature projection which is designed to fit within a matching recess or depression on the second part. The presence of a locking feature or features allows for the at least two parts to be held together in intimate contact. A locking feature geometry, suitable for use in a snap-fit connection, is illustrated in FIG. 4.

By introducing locking feature(s) into the projection (castellation) cross-section, the at least two parts can be designed to be temporarily or permanently joined to one another in intimate contact and provide the option of no chemical welding of the parts being necessary, thereby reducing further cost from the manufacture and assembly of the shaped article.

The present inventors have found that preferably the thickness of the child projections (castellations) is no more than 0.75 times the section thickness of the parent section or parent projection (castellation). The present inventors have found that this ensures the prevention of areas of sink in the parent section opposite where projections (castellations) join the parent section.

Grandchild projections (castellations) are preferably no more than 0.75 times the section thickness of the child projection (castellation) or section they extend from.

At the junction where the base or root of the child projection (castellation) meets the parent projection (castellation) a curve may be present in order to reduce stress concentration. Preferably the minimum radius is at least 0.25 times the parent section thickness.

The projection (castellation) cross section may at its tip possess a matching radius with that of the recess to which it is to be joined. The surface geometry of the at least two parts to be joined may mirror one another and a tessellated fit is possible when the at least two parts are assembled. If projections on one part are designed to be slightly wider than required for a tessellated fit, the resulting interference fit may prevent the parts from coming fully together. However, ultrasonic welding techniques can be used to melt the parts along the faces of this interference and thus provide the final relief necessary to move the parts together and form the final geometry of the shaped article whilst at the same time providing a permanent chemical bond once the polymer has re-solidified.

One or more of the projections or castellations may possess a draft angle of about 0.5° to about 5°, e.g. about 2° to about 5°, relative to the axis of the mould opening in order to aid removal from the cavity of the (injection) moulding tool and for easier alignment and assembly of the parts after moulding is complete.

The parts may be assembled to form a shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers.

Parts may also be designed with snap fitting projections or snap fitting joints (or snap fitting castellations), where the geometry of one part is designed with a locking feature on the end of a projection (e.g. lever) which flexes to one side during part assembly and allows the parts to be pushed together until the locking feature fits into a matching recess (or depression) on the second part. The stored energy due to deformation of the lever allows the lever on the first part to move back to its original position once the locking feature is accepted in the depression, leading to an interference fit due to the undercut geometry for example that allows for the parts to be temporarily or permanently held together. The degree to which the joint is permanent or temporary is typically dependent on the design of the locking features.

A further technique developed by the present inventors comprises the assembly of parts in a single processing step by re-melting the assembly of parts within a tool designed to match the outer circumference shape of the assembly. This method is well suited to assembling many thermoplastic parts and is well suited to the assembly of the at least two (complex) parts which may be shaped resulting from this invention. Hence the at least two prepared parts may be joined in a method which comprises:

assembling the at least two prepared parts in a cavity of a tool to form an assembly of the at least two parts, wherein said cavity is adapted to receive the assembly of at least two parts in the form of the shaped article;

sealing the cavity of the tool;

melting the assembly of at least two parts to chemically bond the at least two parts together to form the shaped article.

Figure 1:
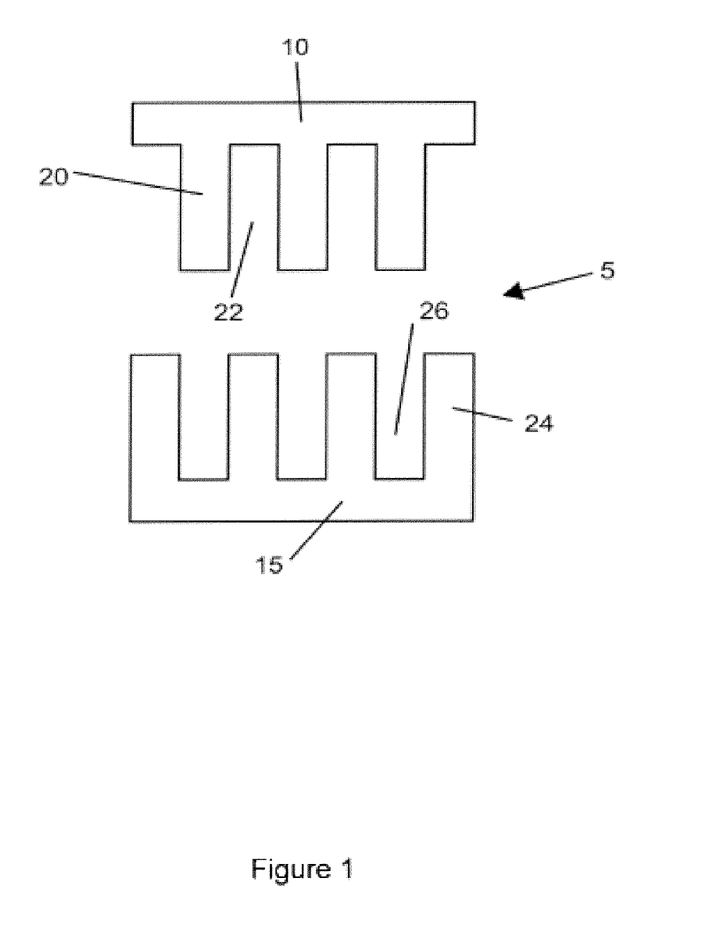
FIG. 1 shows a cross section of at least two parts in accordance with the present invention which may be engaged or joined in order to form a shaped article.

FIG. 1 shows at least two parts in accordance with the present invention indicated generally at (5) which may be engaged or joined in order to form a shaped article. In FIG. 1, a first part (10) is shown possessing a number of projections in the form of castellations, one of which is indicated at (20), plus a number of recesses in between the castellations, one of which is indicated at (22). A second part (15) in effect reciprocates the first part (10) and a castellation and recess are indicated at (24) and (26) respectively. A joined structure comprising a greater number of castellations is shown in FIG. 3.

Figure 2:
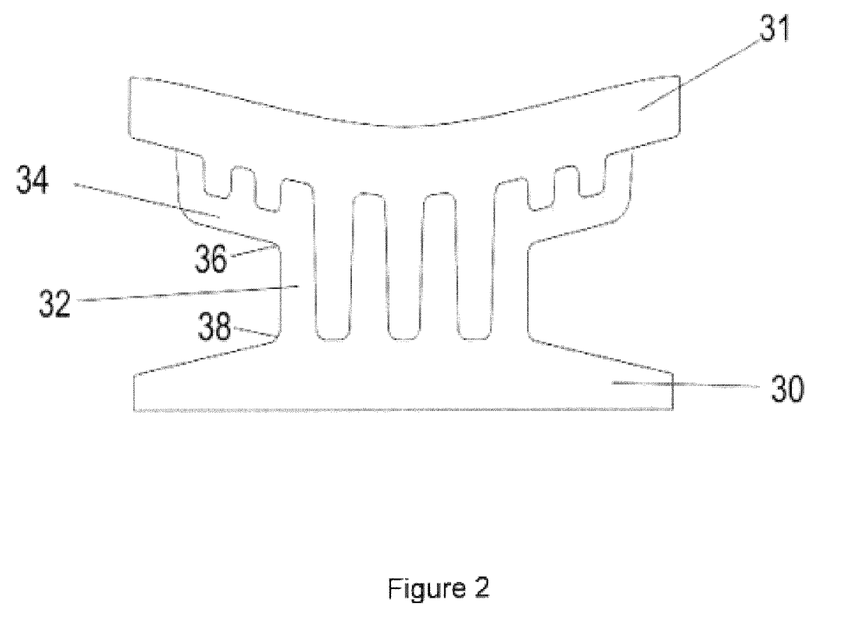
FIG. 2 illustrates a cross section of at least two parts which are joined to form a shaped article and further illustrates the presence of projections (e.g. castellations) and child projections (e.g. child castellations).

FIG. 2 illustrates a more complex shaped article which may be formed in accordance with the present invention. The main body of the parts is indicated at (30) and (31). A parent projection (in the form of a castellation) extending from the main body of the part (30) is indicated at (32), extending therefrom is a child castellation (34). Grandchild castellation(s) (not shown) may extend from the child castellation(s). The junction of the child castellation with the parent castellation is shown at (36) and the junction of the parent castellation with the main body is indicated at (38).

FIG. 3 illustrates a shaped thick article in the form of a rectangular cross section design indicated at (50). This may be described as a nominal shaped article cross section. The shaped article is shown with dimensions indicted at (a) and (b). By way of example, "a" may be about 60 mm and "b" about 28 mm. Conventionally, such a shaped article would need to be (injection) moulded in a large number of parts in order to achieve a good quality product. In accordance with the method of the present invention, by designing and introducing a single continuous split line to divide the article to form two parts via a number of projections or castellations, it is possible to reduce the number of parts required to just two. The two parts are indicated at (52) and (54). Projections or castellations are indicated on the first part and second part at (56) and (60) respectively and recesses at (58) and (62) respectively. By introducing a number of projections or castellations, shaped articles may be sub-divided into parts with reduced section thickness in their cross section which may be moulded separately thus addressing some of the problems associated with injection moulding thicker parts. For example, the dimension at "c" may be 4 mm. The castellations (56) and (60) and recesses (58) and (62) are illustrated in FIG. 3 as possessing rounded or curved ends. In effect, the surface geometry of the at least two parts to be joined mirror one another and a tessellated fit is provided when the at least two parts are assembled. The final shaped article is indicated generally at (65). The two parts (52) and (54) may, for example, be joined by welding to form the final shaped article. If projection cross section on one part are designed to be slightly wider than required for a tessellated fit, the resulting interference fit may prevent the parts from coming fully together. However, ultrasonic welding techniques can be used to melt the parts along the faces of this interference and thus provide the final movement necessary to form the final geometry of the shaped article whilst at the same time providing a permanent chemical bond once the polymer has re-solidified. The final shaped article (65) when compared with the nominal shaped article (50) retains or possesses the same or substantially the same geometry footprint.

FIG. 4 shows at least two parts in accordance with the present invention indicated generally at (72) and (74) respectively which may be engaged or joined in order to form a shaped article (indicated generally at (85)). In part (72) the part is shown possessing a number of projections one of which is indicated at (76). A corresponding recess in part (74) is shown at (78). In a projection (79) present on part (74) a notch or locking feature (80) is present. The notch is designed to engage with a notch or locking feature (82) present on the projection (76) in a type of snap fit arrangement. The projections (76) and (79) possess sufficient flexibility so that when the parts (72) and (74) are pushed together, one or both of the projections (76) and (79) flex to one side, thus allowing the parts to be pushed together and engaged in a type of "snap-fit" arrangement. The stored energy in the flexed projections (76) and (79) allows the locking feature (80) to move back to its original position once the locking feature (80) is accepted in the locking feature (or depression) (82).

Filler Material

The at least two parts may independently of each other possess at least one filler material. However, the at least two parts will more typically be chemically the same or substantially the same.

Relative to the total dry volume of the filled part (e.g. polymer), the filler material may be present in an amount of 0 vol % to about 60 vol %, for example from at least about 5 vol % to about 60 vol %. The amount of filler material present in the part is measured based on the total volume of the dry components of the filled part.

The host polymer may be filled by methods in which a filler material (present in particulate and/or fibrous form) and a polymer resin are mixed together in suitable ratios to form a blend (so-called "compounding"). The volume fraction (Vf) of filler material may be referred to herein as "filler Vf".

The polymer resin may be in a form (e.g. liquid form) to enable the filler to be dispersed therein. Where the polymer resins are solid at ambient temperatures, the polymer resin may need to be melted before the compounding can be accomplished. In some embodiments, the filler material may be dry blended with particles of the polymer resin.

The polymer resin, the filler material, and if necessary, any other optional additives, may be formed into a suitable masterbatch by the use of a suitable compounder/mixer in a manner known per se. The master batch may be pelletized, e.g. by the use of a single screw extruder or a twin-screw extruder which forms strands which may be cut or broken into pellets. The compounder may have a single inlet for introducing the filler and the polymer resin together and any other constituents. Alternatively, separate inlets may be provided for the filler and the polymer resin plus any other necessary constituents. Suitable compounders are available commercially, for example from Coperion (formerly Werner & Pfleiderer). Preferably, the polymer composition for use in accordance with the present invention is prepared prior to injection moulding.

Other materials may be incorporated in the blend. For example, pre-treatment of filler material using surface modifiers assist the filler flow in the compounding hopper, and/or polymer wet-out, and/or deagglomeration and/or a reduction in melt viscosity. One or more lubricating waxes may be incorporated in the blend to reduce melt viscosity and/or improve flow and strand forming capabilities.

The person skilled in the art realizes that the present invention is by no means limited to the preferred embodiments described above. On the contrary, many modifications and variations are possible within the scope of the appended claims. For example, modified Luneburg lenses may be incorporated in the various aspects of the present invention. For example multilayer RF products such as lenses, Luneberg lenses, transformation optics, beam forming optics, waveguides, retro-reflectors and resonators may be incorporated in the various aspects of the present invention. For example multi-material functional components such as: sensors, actuators, motors, valves, and pharmaceutical products such as implants, prosthetics, applicators, medicine dispensers and the like may be incorporated in the various aspects of the present invention.

The invention claimed is:

1. A method of making a shaped article in the form of a radiofrequency product comprising at least two parts which are joined, the method comprising: creating a design of said shaped article and defining a split line on said design, wherein said split line divides the shaped article to provide at least a first part and a second part; wherein said first part comprises a plurality of projections and at least one recess between projections; wherein said second part comprises a plurality of projections and at least one recess between projections;
preparing said first part and said second part in a moulding process; and joining the prepared first part and the prepared second part together by engaging projections with recesses in a tessellated fit to form said shaped article.

2. The method according to claim 1 wherein the moulding process is an injection moulding process.

3. The method according to claim 1, wherein the split line is a single continuous line.

4. The method according to claim 1, wherein the at least a first part and a second part are polymer compositions comprising a polymer.

5. The method according to claim 4 wherein the polymer compositions are filled with a filler material.

6. The method according to claim 4, wherein the polymer is selected from polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU), epoxies, silicones, phenolics, or polyesters.

7. The method according to claim 1, wherein the design is a computer aided design (CAD) drawing.

8. The method according to claim 1, wherein the at least one projection possesses a tip with a matching radius with that of the recess to which it is to be engaged.

9. The method according to claim 1, wherein neither of the at least two parts has a section thickness greater than about 4 mm.

10. The method according to claim 1, wherein the at least two prepared parts are joined by ultrasonic or vibrational welding.

11. The method according to claim 1, wherein a locking feature is present on the at least one projection and a locking feature is present on the at least one recess and the locking features are engaged in a snap fit arrangement to join the at least two prepared parts.

12. The method according to claim 1, wherein the at least two prepared parts are joined in a method which comprises: assembling the at least two prepared parts in a cavity of a tool to form an assembly of the at least two parts, wherein said cavity is adapted to receive the assembly of at least two parts in the form of the shaped article; sealing the cavity of the tool; and melting the assembly of at least two parts to chemically bond the at least two parts together to form the shaped article.

13. The method according to claim 1, wherein the shaped article is in the form of a lens or part of a lens.

14. A shaped article in the form of a radiofrequency product comprising at least two parts which are joined, the shaped article comprising: at least a first part and a second part;
wherein said first part comprises a plurality of projections and at least one recess between projections; wherein said second part comprises a plurality of projections and at least one recess between projections; and wherein the first part and the second part are joined together by engaging projections with recesses in a tessellated fit.

* * * * *